Oct. 29, 1957  W. B. SMITS  2,811,676
JET ENGINE OR GAS TURBINE WITH ELECTRIC IGNITION
Filed Nov. 7, 1952
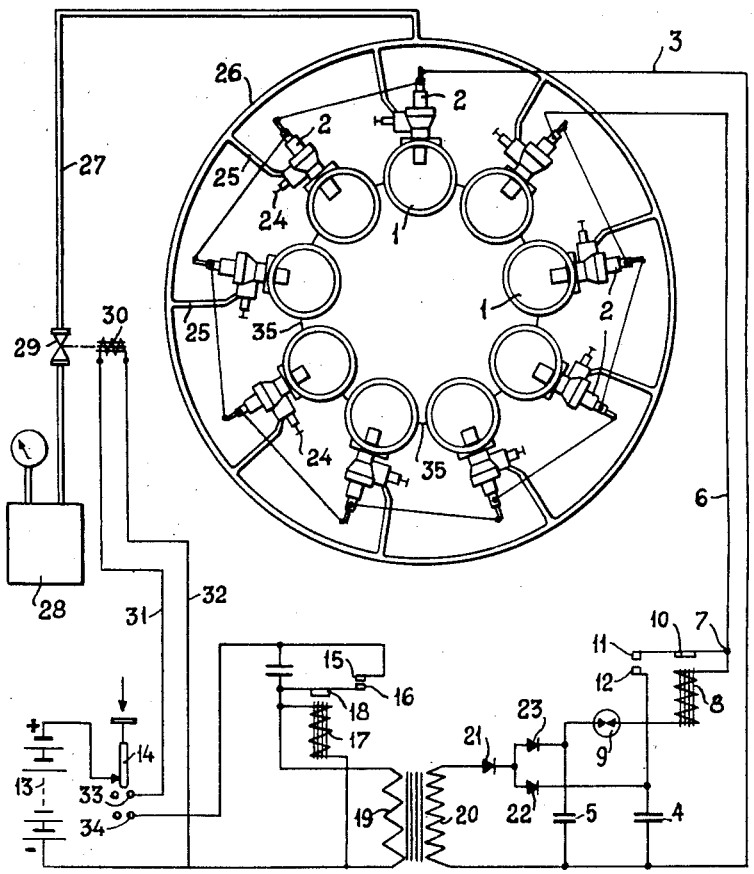
INVENTOR
WYTZE BEYE SMITS,
BY Robert B. Lamon
ATTORNEY United States Patent Office 2,811,676
Patented Oct. 29, 1957

2,811,676

JET ENGINE OR GAS TURBINE WITH ELECTRIC IGNITION

Wytze Beye Smits, Voorburg, Netherlands, assignor to Smitsvonk N. V., Leidschendam, Netherlands, a company Application November 7, 1952, Serial No. 319,211

2 Claims. (Cl. 317—83)

The invention relates to a jet engine or a gas turbine with a number of co-operating and/or interconnected combustion chambers and an electric device with a number of spark plugs, fed by a condenser system, for the ignition of the fuel introduced into said chambers.

Jet engines or gas turbines for aircraft are generally equipped with a relatively large number—for example nine—of combustion chambers arranged in a circle, which are connected in parallel with an exhaust pipe and/or operate on a turbine.

For the ignition of the mixture in the combustion chambers one or either of at most two of the said chambers is provided with an electric igniter torch, consisting of a high voltage spark plug and a fuel atomizer which atomizes the ignition fuel in the immediate neighbourhood of the spark plug, while the combustion chambers are interconnected by an annular channel. The ignition fuel generally used is the normal fuel, which is forced under increased pressure through the atomizer of the igniter torch by a separate pump.

This ignition fuel is ignited by an electric spark of the spark plug, and then ignites the fuel in the combustion chambers in which the torch is arranged.

Through the annular connecting channels between the combustion chambers the ignition spreads to the combustion chambers without igniter torches. The drawbacks of this known ignition system for jet engines and gas turbines are manifold. In view of the high voltage and the rarefied air in which the aircraft may have to fly the electric conductors of this system must be very heavily insulated, must not be liable to cause any corona phenomena, and must be supported by long insulators.

In view of this, the ignition system takes up much space and has great weight, so that it is to be considered very unsuitable in practice to equip each combustion chamber with an igniter torch of its own and accessories. It has further been found that when the velocity of the air in the combustion chambers—which velocity is partly determined by the speed of the aircraft—exceeds a given value, the spark plug is no longer capable of igniting the ignition fuel atomized by the torch, and the torch, if burning at all, is even blown out.

Further it has been established that with the high velocities of the air that may occure the flame will have difficulty in spreading through the annular connecting channel from one combustion chamber to the next, or will fail to do so altogether.

If the ignition is to be guaranteed, care must be taken in the first place that the current of air in the combustion chambers be slowed down. When an aircraft with a jet engine stands on the ground, this requirement can easily be complied with. However, when the aircraft is in the air and is flying at great speed, it appears that when the burners have been extinguished by some cause or other, the engine can only be re-ignited if the speed of the aircraft is slowed down considerably and the aircraft proceeds to fly at lower altitudes. Even then the re-ignition appears to be doubtful, and the risk of accidents owing to the failure of this ignition is still great.

The pilot will often try again and again to bring about ignition of the fuel, as a result of which large quantities of fuel will collect in the engine components. If then the fuel does happen to be ignited at low speed, such a powerful explosion will occur that the aircraft will be blown up and everything will be destroyed. It is to this that the accidents are to be attributed.

But even when the re-ignition of the fuel in a combustion chamber with an igniter torch is properly effected, it is not yet certain that the other burners will also be re-ignited. If this is not the case, the said burners will continually inject fuel into the engine components, which fuel is not burned. As soon as the velocities of the air are decreased and the flame spreads from one combustion chamber to the next, a violent explosion may occur in the chambers that have not yet been ignited and the other spaces through which the combustion gases pass, and this explosion may also cause the aircraft to be wrecked.

The invention provides a jet engine or a gas turbine with an ignition system in which the difficulties outlined above have been completely obviated.

It consists in that the spark plugs are surface discharge spark plugs, and are connected in series, and that the spark plugs are connected to the condenser system in such a way that the current with which the condenser system is regularly discharged and/or charged flows through the said spark plugs. Surface discharge spark plugs fed by condensers can operate at comparatively very low voltages. This makes it possible to connect a large number of spark plugs in series without the voltage to be generated by the ignition system attaining an unsuitably high value, as would be the case if the conventional high voltage spark plugs were to be connected in series, even if this should be technically practicable. The series connection of the surface discharge spark plugs does not require any higher total voltage than does one high voltage spark plug, so that the insulation problems are no greater than those already known in connection with the conventional ignition system and in jet engines or gas turbines for aircraft.

The surface discharge spark produced exclusively by a condenser is insensitive to the deposition of fuel and combustion products in the combustion chambers. The output of such a spark is so great that the re-ignition of the mixture in the combustion chambers is possible without any difficulty. Since a large number of surface discharge spark plugs can be connected in series without the insulation problems becoming insoluble for practical purposes, each combustion chamber of the engine or turbine may be provided with a spark plug of its own. The risk of explosions in chambers in which the mixture is not ignited direct by the ignition system is thus reduced to nil. The low voltage surface discharge spark plugs operating on condensers also have the advantage that when an additional quantity of ignition fuel is fed to the spark plug, this fuel need not be atomized by high pressure, as is the case in the known high voltage torch ignition systems.

The liquid fuel may be fed to the spark plugs at ordinary pressure, because the said ignition liquid is atomized by the energy of the spark itself. The surface discharge spark plugs may therefore each be provided with a channel for the feeding of the ignition fuel, and may be connected via said channel with a joint fuel conduit, in which is provided a valve which is operated by an electric device, for example an electromagnet, which is energized just before or simultaneously with the switching in of the ignition system.

In order to have the atomization and the subsequent ignition of the ignition fuel by the energy of the spark proceed as effectively as possible, it is advisable to provide the sparking surface of each of the surface discharge spark plugs in an open cavity in which the channel for the ignition fuel ends, and further to design the ignition system in such a manner that at least two rapidly succeeding sparks are produced on all the spark plugs simultaneously, the first spark atomizing the fuel and the immediately succeeding spark igniting this atomized fuel.

The system according to the invention mainly differs from the known system in that all the combustion chambers of the jet engines or gas turbines may be provided with spark plugs, the insulation problems are no greater than those already solved in the known high voltage ignition system, and the whole equipment, including the condenser system, the device for charging the latter, the members for connecting the spark plugs—which are in series—with the condenser system, and the device for feeding ignition fuel to the spark plugs, may be comparatively light in weight and take up little space, a circumstance of great importance for aircraft.

The invention will be further explained with reference to the drawing, which shows a diagrammatic illustration of an ignition system for a jet engine or a gas turbine with nine combustion chambers.

In the drawing, the numeral 1 designates nine combustion chambers of a jet engine or a gas turbine, operating in parallel, in cross-section. In each of these combustion chambers is provided a surface discharge spark plug 2. These surface discharge spark plugs have at least two separately connectable electrodes, enclosed in the casing of the spark plug so as to be insulated. All the spark plugs are connected in series, and this series connection is connected via a conductor 3 to one pole of two condensers 4 and 5, and via a conductor 6 to the end 7 of a relay coil 8, the other end of which is connected via a spark gap 9 to the other pole of the condenser 5. The relay 8 acts on an armature 10 with a contact 11, which is electrically connected to the point 7 and may be contacted by the relay 8 with a contact 12, which is connected to the other pole of the condenser 4.

The condensers 4 and 5 can be charged with the aid of a battery 13, which can be connected to the primary winding 19 of a transformer via a push button 14 that can be operated by hand or automatically and the co-operating contacts 15, 16 of an electromagnetic interrupter with a coil 17 and an armature 18. The secondary winding 20 of the said transformer is connected via rectifiers 21, 22, 23 to the condensers 4 and 5.

Each of the spark plugs is provided with a channel for the feeding of ignition liquid, which channel ends near the sparking surface of the spark plug and can be adjusted with the aid of a needle valve 24. The liquid channels of the spark plugs are connected via fuel conduits 25 with an annular channel 26, which is connected via a conduit 27 to a fuel tank 28 which is under slightly increased pressure. In the conduit 27 is provided a valve 29, which can be operated by an electromagnet 30. The electromagnet is connected via conductors 31, 32 to a contact 33 of the push button 14 and the battery 13.

The connection of the battery to the interrupter 15—18 is effected via the contact 34 of the push button. This device operates as follows: When the fuel in the combustion space is to be ignited, the push button 14 is pressed. By this means the battery 13 is first connected via the push button 33 to the coil 30 of the electromagnet for the operation of the valve 29. The liquid conduit 27 is then opened, so that ignition liquid is fed to all the spark plugs 2. Just after the opening of the valve 29 the battery 13 is connected via the push button contact 34 and the interrupter 15—18 to the primary winding 19 of the transformer. A series of impulses is now produced by the interrupter in the winding 19.

These impulses are induced in the winding 20, and are passed on via the rectifiers 21, 22, 23 to the condensers 4 and 5. By these rectified impulses of a higher voltage the condensers 4 and 5 are charged. When the condenser 5 has attained a given voltage, the series connection of the spark gap 9 and all the surface discharge spark plugs 2 breaks down, the condenser 5 is discharged via the said spark plugs, and on each of these a powerful spark is produced. This spark atomizes the ignition fuel that collects on the sparking surface of the spark plug. The current required for these sparks, however, passes through the relay coil 8, which attracts the armature 10. Thus the contacts 11 and 12 are interconnected, and a connection is brought about between the condensers 4 and the series connected spark plugs 2. The condenser 4 then also discharges via the spark plugs, and produces a second spark on the latter. This second spark, which occurs immediately after the atomization spark, ignites the atomized fuel. The flame caused by this ignition penetrates deep into the combustion spaces, and ignites the main fuel therein. In each combustion chamber the fuel is therefore ignited separately. In addition the combustion chambers may be interconnected by an annular channel 35, which makes it possible for the flame to spread from one combustion chamber to the next, by way of additional security.

It need hardly be stated that other connecting schemes for the production of the spark on the series connected spark plugs are also possible.

I claim:

1. An ignition system for a jet engine having a plurality of burners comprising, a low voltage surface discharge spark plug for each burner, means for atomizing fuel associated with each plug, said spark plugs being connected in series, a source of electrical energy, a pair of condensers, means connecting said condensers with said source, and means for sequentially connecting said condensers with said series connected spark plugs whereby the charge from the condenser which is fired first atomizes the fuel and the charge from the condenser which is fired second fires the atomized fuel.

2. The combination according to claim 1 and further including relay means for opening a fuel supply line to the spark plugs and switch means for first energizing said relay means and subsequently closing the circuit means connecting the condensers with said source.

References Cited in the file of this patent

UNITED STATES PATENTS

| | | |
|---|---|---|
| 553,304 | Farquharson | Jan. 21, 1896 |
| 1,948,974 | Talmey | Feb. 27, 1934 |
| 1,960,845 | Gilbert | May 29, 1934 |
| 2,543,366 | Haworth et al. | Feb. 27, 1951 |
| 2,550,875 | Smits | May 1, 1951 |
| 2,551,101 | Debenham et al. | May 1, 1951 |
| 2,589,164 | Tognola | Mar. 11, 1952 |
| 2,659,200 | Thompson | Nov. 17, 1953 |